(12) United States Patent
Schroeder

(10) Patent No.: US 6,232,770 B1
(45) Date of Patent: May 15, 2001

(54) LOW COST SINGLE MAGNETORESISTOR POSITION AND SPEED SENSOR

(75) Inventor: Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/345,899

(22) Filed: Jul. 1, 1999

(51) Int. Cl.⁷ .............................. G01B 7/30; G01R 33/06
(52) U.S. Cl. ........................ 324/207.21; 324/207.12; 324/207.25
(58) Field of Search .................. 324/207.21, 207.12, 324/207.25, 174, 207.2, 252, 173, 166; 338/32 R, 32 H; 327/20, 58, 63

(56) References Cited

U.S. PATENT DOCUMENTS

| | | | |
|---|---|---|---|
| 4,712,064 | * 12/1987 | Eckardt et al. | 324/208 |
| 4,835,467 | 5/1989 | Gokhale | 324/166 |
| 4,926,122 | 5/1990 | Schroeder et al. | 324/207.13 |
| 4,939,456 | 7/1990 | Morelli et al. | 324/207.21 |
| 5,157,329 | * 10/1992 | Brauer | 324/207.25 |
| 5,210,489 | * 5/1993 | Peterson | 324/207.12 |
| 5,570,016 | 10/1996 | Schroeder et al. | 324/207.25 |
| 5,714,883 | 2/1998 | Schroeder et al. | 324/207.22 |
| 5,731,702 | 3/1998 | Schroeder et al. | 324/207.21 |
| 5,754,042 | 5/1998 | Schroeder et al. | 324/207.25 |

* cited by examiner

*Primary Examiner*—Jay Patidar
*Assistant Examiner*—Reena Aurora
(74) *Attorney, Agent, or Firm*—Margaret A. Dobrowitsky

(57) ABSTRACT

A method and apparatus wherein a single element sensor, preferably a single element magnetoresistive sensor, is utilized to sense crankshaft position and rotational speed from the passage of single tooth edges of an encoder or target wheel and determines its offset voltage by measuring the MR voltage over a slot in the target wheel. This is accomplished by inclusion of a valley detector in the sensor circuit. Subtracting the signal of the valley detector from the MR signal yields an MR signal with a zero offset utilizing a comparator with an appropriate fixed reference (hysteresis) to generate the desired output signal. The accuracy of the sensor can be improved by amplifying the MR signal prior to feeding it into the comparator. The amplification simply increases the slopes of the signal and permits the use of a higher threshold voltage level in the comparator.

10 Claims, 2 Drawing Sheets

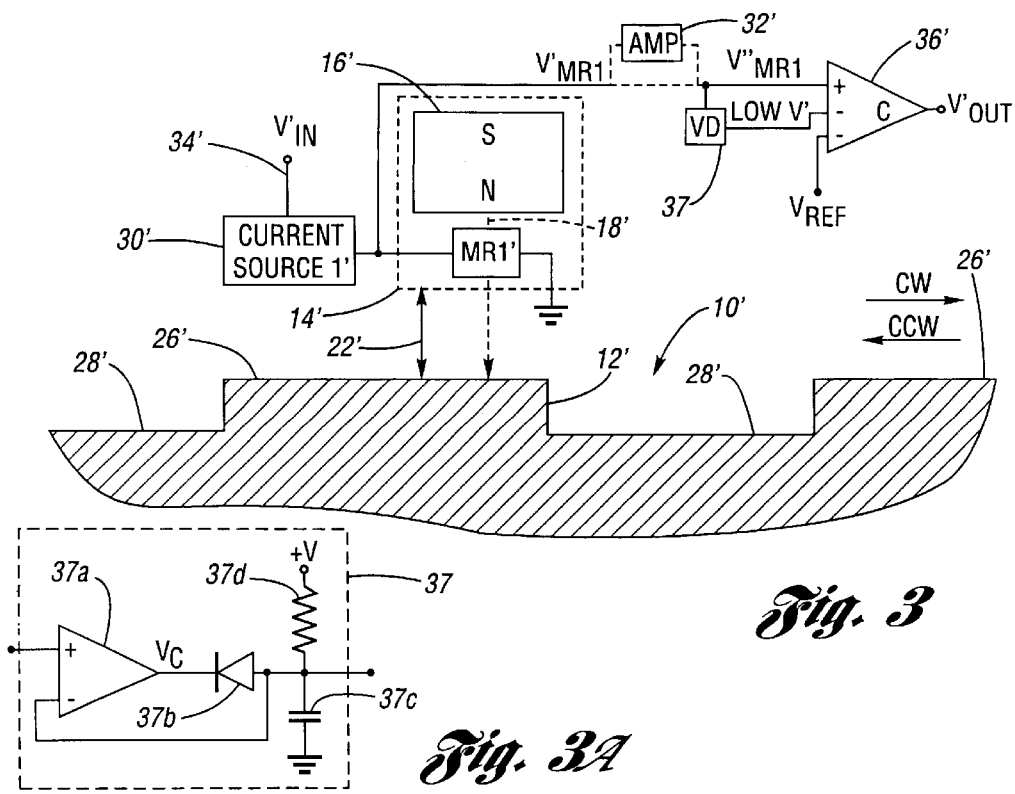
*Fig. 3*
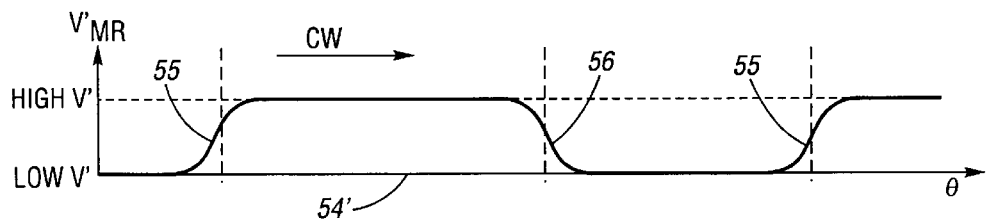
*Fig. 3A*
*Fig. 4A*
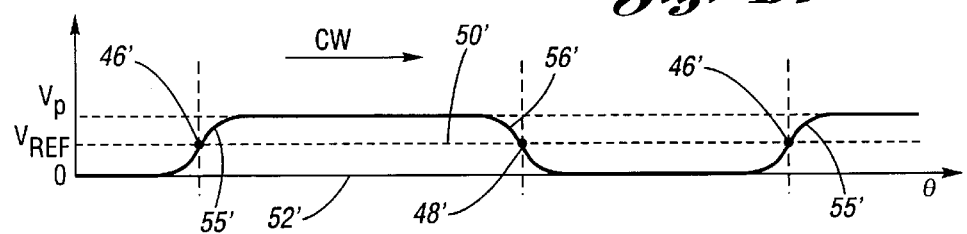
*Fig. 4B*
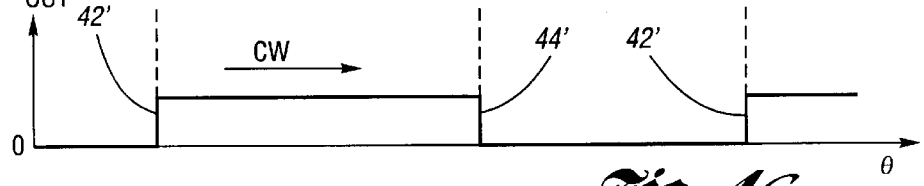
*Fig. 4C*

LOW COST SINGLE MAGNETORESISTOR POSITION AND SPEED SENSOR

TECHNICAL FIELD

The present invention relates to a method of sensing precise angular position and speed of rotation of a rotating object and more particularly to a method for sensing crankshaft or camshaft rotational position and speed of rotation wherein a sensor, preferably but not exclusively a single element magnetoresistive (MR) sensor, is utilized to sense crankshaft position and rotational speed from the passage of single tooth edges of an encoder or target wheel.

BACKGROUND OF THE INVENTION

It is well known in the art that the resistance modulation of Hall elements or magnetoresistors can be employed in position and speed sensors with respect to moving magnetic materials or objects (see for example U.S. Pat. Nos. 4,835,467, 4,926,122, and 4,939,456). In such applications, the magnetoresistor (MR) is biased with a magnetic field and electrically excited, typically, with a constant current source or a constant voltage source. A magnetic (i.e., ferromagnetic) object rotating relative and in close proximity to the MR, such as a toothed wheel, produces a varying magnetic flux density through the MR, which, in turn, varies the resistance of the MR. The MR will have a higher magnetic flux density and a higher resistance when a tooth of the rotating target wheel is adjacent to the MR than when a slot of the rotating target wheel is adjacent to the MR. The use of a constant current excitation source provides an output voltage from the MR that varies as the resistance of the MR varies.

Accurate engine crank position information is needed for ignition timing and OBDII mandated misfire detection. Increasingly more sophisticated spark timing and emission controls introduced the need for crankshaft sensors capable of providing precise position information during cranking. Various combinations of magnetoresistors and single and dual track toothed or slotted wheels (also known as encoder wheels and target wheels) have been used to obtain this information (see for example U.S. Pat. Nos. 5,570,016, 5,714,883, 5,731,702, and 5,754,042).

The crank position information is encoded on a rotating target wheel in the form of teeth and slots. The edges of the teeth define predetermined crank positions. The sensor is required to detect these edges accurately and repeatably over a range of air gaps and temperatures. Virtually all such sensors are of the magnetic type, either variable reluctance or galvanomagnetic (e.g. Hall generators or magnetoresistors). Galvanomagnetic sensors are becoming progressively most preferred due to their capability of operation down to a zero speed, greater encoding flexibility and standardized output signals.

Furthermore, temperature and the size of the air gap affect the output signal of a magnetic sensing element. Consequently, operation over wide temperature and air gap size ranges requires some form of compensation for the resultant signal drift, both in amplitude and offset. The most common approach is the use of two matched sensing elements operating in a differential mode thereby providing a common mode rejection.

An example of such a sensor is the sequential crankshaft sensor used on several of General Motors Corporation trucks. This sensor employs two matched InSb magnetoresistor elements located radially proximate to the target wheel, one being slightly displaced with respect to the other in the direction of target wheel rotation. FIG. 1 is a schematic representation of an exemplar automotive environment of use according to this prior art scheme, wherein a target wheel 10 is rotating, such as for example in unison with a crankshaft, a drive shaft or a cam shaft, and the rotative position thereof is to be sensed. Rotative position of the target wheel 10 is determined by sensing the passage of a tooth edge 12, either a rising tooth edge 12a or a falling tooth edge 12b, using a single dual MR differential sequential sensor 14. A tooth edge 12 is considered rising or falling depending upon the direction of rotation of the target wheel 10 with respect to the magnetoresistive sensors MR1 and MR2. MR1 is considered leading and MR2 is considered lagging if the target wheel 10 is rotating in a clockwise (CW) direction whereas if the target wheel is rotating in a counterclockwise (CCW) direction then MR1 is considered lagging whereas MR2 is considered leading. For purposes of example, the target wheel 10 will be assumed to be rotating in a CW direction in the views.

The single dual MR differential sequential sensor 14 employs two matched magnetoresistor elements, MR1 and MR2, which are biased by a permanent magnet 16, wherein the magnetic flux 18 and 20 emanating therefrom is represented by the dashed arrows. The magnetic flux 18 and 20 passes from the permanent magnet 16 through the magnetoresistors MR1 and MR2 and through the air gaps 22 and 24 to the target wheel 10. The target wheel 10 is made of a magnetic material having teeth 26 and spacings 28 therebetween. The spacing L between MR1 and MR2 is generally such that the trigger points for the rising and falling edges of the output signal $V_{OUT}$ as shown in FIG. 2C are dependent on the leading MR only as depicted in FIGS. 2A, 2B and 2C, as will be later described.

Power is supplied to CURRENT SOURCE1 30 and CURRENT SOURCE2 32 through voltage source 34. Power is also supplied to a comparator 36 (with hysteresis) through voltage source 34 but is not shown. CURRENT SOURCE1 30 supplies current to MR1 thereby providing for an output voltage $V_{MR1}$ from MR1. CURRENT SOURCE2 32 supplies current to MR2 thereby providing for an output voltage $V_{MR1}$ from MR2. Output voltages $V_{MR1}$ and $V_{MR2}$ are input into the comparator 36 whose output voltage $V_{OUT}$, as shown in FIG. 2C, is an indication of the position of rotation of the target wheel 10. It is to be understood that all voltages are measured with respect to ground unless otherwise indicated herein, and that CURRENT SOURCE1 is matched to CURRENT SOURCE2.

As shown in FIG. 2A, the lagging MR element, in this case MR2, provides a delayed signal in every respect identical to the signal from the leading MR, in this case MR1. The differential signal $V_D=V_{MR1}-V_{MR2}$, shown in FIG. 2B is electronically generated within the comparator 36 and is then used by the comparator to reconstruct the signal $V_{OUT}$ (shown in FIG. 2C) emulating the profile of the target wheel 10. Upon a closer inspection of FIGS. 2A, 2B and 2C, it becomes evident that the rising edges 42 and the falling edges 44 of the sensor output signal $V_{OUT}$ are determined only by first points 46 corresponding to the rising edges and second points 48 corresponding to the falling edges where the signal from the leading MR, in this example MR1, crosses a first threshold voltage 50 corresponding to the first points and a second threshold voltage 52 corresponding to the second points wherein the first and second threshold voltages are determined by the hysteresis applied to the comparator 36. The lagging MR, in this example MR2, has no part in the generation of the rising edges 42 or the falling edges 44 of the output signal $V_{OUT}$. The lagging MR simply determines the offset voltage 54 of the leading MR.

What is needed is a method and apparatus wherein a single element sensor, preferably, but not exclusively, a single element magnetoresistive sensor, is utilized to sense crankshaft position and rotational speed from the passage of single tooth edges of an encoder or target wheel.

SUMMARY OF THE INVENTION

The present invention provides a method and apparatus wherein a single element galvanomagnetic sensor, herein exemplified by a single element magnetoresistive (MR) sensor, is utilized to sense crankshaft position and rotational speed from the passage of single tooth edges of an encoder or target wheel and determines its offset voltage by measuring the MR voltage over a slot in the target wheel. This is accomplished by inclusion of a valley detector in the sensor circuit. Subtracting the signal of the valley detector from the MR signal yields an MR signal with a zero offset utilizing a comparator with an appropriate fixed reference (hysteresis) to generate the desired output signal.

The accuracy of the sensor can be improved by amplifying the MR signal prior to feeding it into the comparator. The amplification simply increases the slopes of the signal and permits the use of a higher threshold voltage level in the comparator.

Accordingly, it is an object of the present invention to provide a digital output voltage for detecting angular position of rotation of a target wheel utilizing a single element sensor.

It is an additional object of the present invention to provide a digital output voltage for detecting speed of rotation of a target wheel utilizing a single element sensor.

These, and additional objects, advantages, features, and benefits of the present invention will become apparent from the following specification.

BRIEF DESCRIPTION OF THE DRAWINGS

FIG. 3 depicts an example of a preferred environment of use of a single MR position sensor according to the present invention.

FIG. 3A depicts an example of a circuit for providing the valley detector of FIG. 3.

FIG. 4A depicts a plot of the MR voltage for a CW rotation of the target wheel according to the present invention.

FIG. 4B depicts a plot of the differential voltage $V'_D = V''_{MR1} - LOW\ V'$ of FIG. 4A according to the present invention.

FIG. 4C depicts a plot of the output voltage $V'_{OUT}$ of the comparator according to the present invention.

DESCRIPTION OF THE PREFERRED EMBODIMENT

Figure 1:
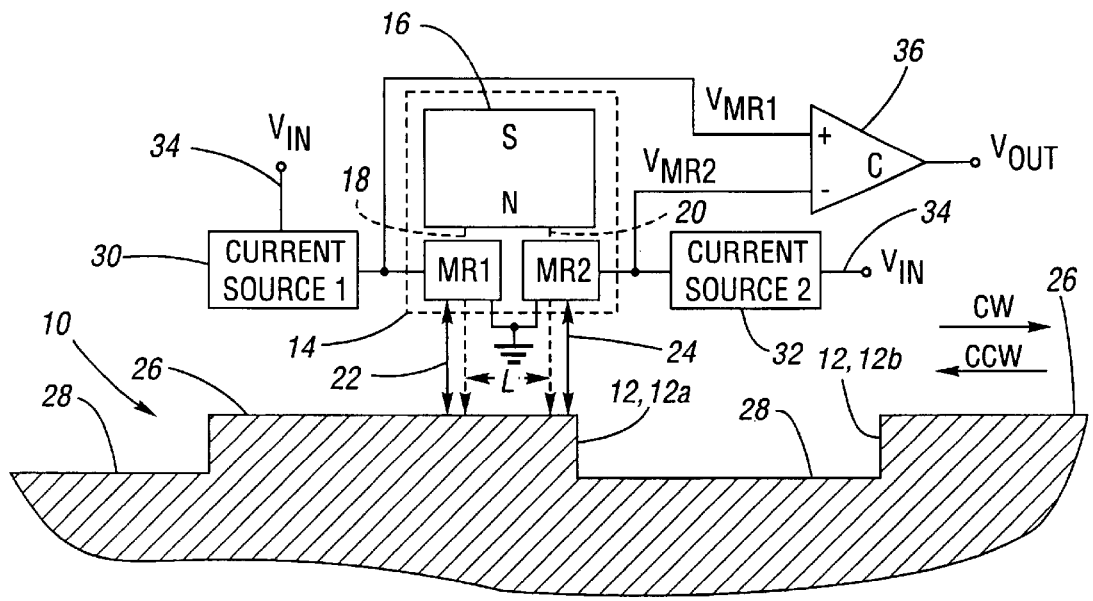
FIG. 1 is a schematic representation of an exemplar automotive environment of use of a prior art dual MR position sensor.

FIG. 3 is a schematic representation of an exemplar automotive environment of use of the present invention, wherein a target wheel 10' is rotating, such as for example in unison with a crankshaft, a drive shaft or a cam shaft, and the rotative position and/or speed thereof is to be sensed. Rotative position of the target wheel 10' is determined by sensing the passage of a rising tooth edge 12' using a single element sensor 14'. A tooth edge 12', in the context of the present invention, is considered rising whether the target wheel 10' is rotating in a clockwise (CW) direction or rotating in a counterclockwise (CCW) direction. For purposes of example, the target wheel 10' will be assumed to be rotating in the CW direction in FIGS. 3 through 4C.

The single element MR sensor 14' employs a single magnetoresistor element MR1' which is located radially proximal to the target wheel and is biased by a permanent magnet 16', wherein the magnetic flux 18' emanating therefrom is represented by the dashed arrows. The magnetic flux 18' passes from the permanent magnet 16' through the magnetoresistor MR1 and through the air gap 22' to the target wheel 10'. The target wheel 10' is made of a magnetic material having teeth 26' and spacings 28' therebetween.

Power is supplied to CURRENT SOURCE1' 30' through a voltage source 34'. To those skilled in the art, it is apparent that power must also be supplied to the circuit elements: a comparator 36', an optional voltage amplifier 32' and a valley detector 37, and is routinely accomplished through the voltage source 34' but, for clarity, is not shown. CURRENT SOURCE1' 30' supplies current to MR1', thereby providing for an output voltage $V'_{MR1}$ from MR1'. Output voltage $V'_{MR1}$ is input to the voltage amplifier 32', to the optional comparator 36', and to the valley detector 37. The output voltage $V'_{OUT}$ of comparator 36' as shown in FIG. 4C, is an indication of the position of rotation of the target wheel 10'. It is to be understood that all voltages are measured with respect to ground unless otherwise indicated herein.

FIG. 4A depicts the MR1' voltage, $V'_{MR1}$, as the target wheel 10' rotates in the CW direction. $V'_{MR1}$ has a highest voltage, HIGH V', when MR1' is adjacent a tooth 26' and a lowest voltage, LOW V', when MR1' is adjacent a slot 28' as previously described and may be amplified, if desired, by voltage amplifier 32'. The amplification increases the voltage of the rising slopes 55 and the voltage of the falling slopes 56 of $V'_{MR1}$ and permits the use of a higher reference voltage, $V_{REF}$, for the comparator 36', thereby improving the accuracy of MR1'.

The implementation of the valley detector is well known in the art. FIG. 3A depicts an example of the valley detector 37. When $V''_{MR1}$ is less than LOW V', the output $V_c$ of the comparator 37a goes low and forward biases the diode 37b. The capacitor 37c will now quickly discharge through the diode 37b and the comparator 37a (due to a very small discharge time constant) until LOW V' becomes greater than $V''_{MR1}$. Now, the output $V_c$ of the comparator 37a goes high and reverse biases the diode 37b. The capacitor 37c will now start charging through the resistor 37d. The charging time (ie., RC time constant) is adjusted such that the capacitor 37c charges very slowly compared to a tooth-slot time cycle, thereby essentially maintaining the voltage of the previous input $V''_{MR1}$ as the present output voltage LOW V'. However, if a subsequent input $V''_{MR1}$ has a lower voltage than the present output LOW V' then $V''_{MR1}$ is less than LOW V' and the capacitor 37c will quickly discharge to the new value of the input $V''_{MR1}$ as the new value of the output LOW V'.

Figure 2A:
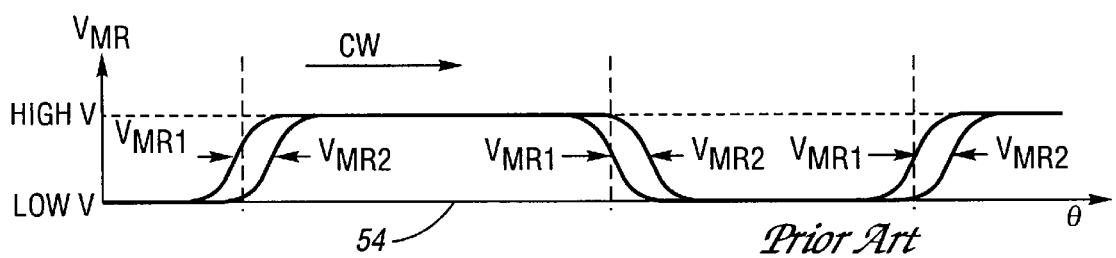
FIG. 2A depicts a plot of MR voltages for a CW rotation of the target wheel according to the prior art.
Figure 2B:
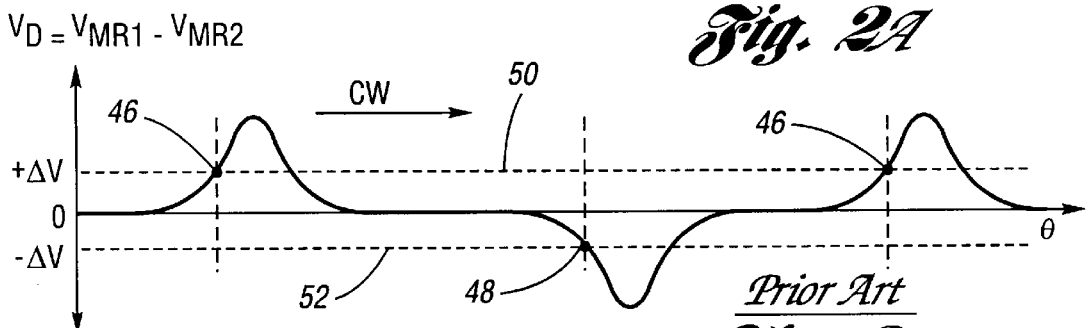
FIG. 2B depicts a plot of the differential voltage $V_D=V_{MR1}-V_{MR2}$, of FIG. 2A according to the prior art.
Figure 2C:
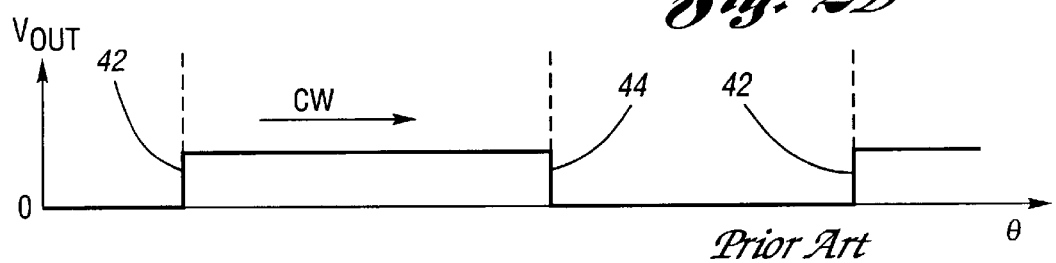
FIG. 2C depicts a plot of the output voltage $V_{OUT}$ of the comparator according to the prior art.

The valley detector 37 detects the lowest voltage LOW V' when MR1' is adjacent a slot 28' of the target wheel 10' and is indicated by voltage line 54' in FIG. 4A. Voltage line 54' is analogous to the offset voltage 54 in FIG. 2A. Subtracting the signal of the valley detector, LOW V', from V"$_{MR1}$, yields a MR1' signal, V'$_D$, with a zero offset voltage and a peak voltage, V$_p$, as shown in FIG. 4B. The differential signal V'$_D$=V"$_{MR1}$–LOW V' shown in FIG. 4B is electronically generated within the comparator 36' and is then used by the comparator with an appropriately preset fixed reference voltage (ie., hysteresis), V$_{REF}$, to reconstruct a binary signal V'$_{OUT}$ (shown in FIG. 4C) emulating the profile of the target wheel 10'.

In FIG. 4B, V$_{REF}$ is indicated by voltage line 50' which corresponds to a threshold voltage for determining the rising edges 42' and the falling edges 44' of V'$_{OUT}$ shown in FIG. 4C. The rising edges 42' of the sensor output signal V'$_{OUT}$ are determined by points 46' corresponding to the rising slopes 55' of the differential voltage V'$_D$ crossing the threshold voltage 50' whereas the falling edges 44' of the sensor output signal V'$_{OUT}$ are determined by points 48' corresponding to the falling slopes 56' of the differential voltage V'$_D$ crossing the threshold voltage 50' thereby generating the binary sensor output signal V'$_{OUT}$ emulating the profile of the target wheel 10'.

It is to be understood that while a magnetoresistor (MR) was exemplified in the foregoing detailed description of a preferred embodiment of the present invention, other analogous sensing elements, such as hall elements my be utilized, the class of such sensors being inclusively denoted as galvanomagnetic elements.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A method for determining position of a target wheel utilizing a single galvanomagnetic element comprising the steps of:
    providing a single galvanomagnetic element sensor that produces a sensor signal responsive to predetermined variations of an adjacent rotating article;
    detecting a lowest voltage value of the sensor signal;
    subtracting the lowest voltage value from the sensor signal to provide a zero offset sensor signal; and
    comparing the zero offset sensor signal to a predetermined reference voltage to thereby generate a binary output signal which is characteristic of the value of the zero offset sensor signal relative to the predetermined reference voltage.

2. The method of claim 1, further comprising amplifying said sensor signal prior to the step of detecting.

3. A single galvanomagnetic element sensor for detecting position of an adjacent rotating article comprising:
    a single galvanomagnetic element;
    magnetic biasing means for magnetically sensitizing said single galvanomagnetic element to predetermined magnetic variations of an adjacent rotating article;
    connection means for connecting said single galvanomagnetic element to a source of electrical power to thereby provide a sensor signal from said single galvanomagnetic element which is responsive to the magnetic variations of the adjacent rotating article;
    valley detection means connected to said single galvanomagnetic element for detecting a lowest voltage of the sensor signal;
    reference signal means for providing a predetermined reference voltage; and
    comparator means for subtracting the lowest voltage from the sensor signal to provide a zero offset sensor signal and for comparing the zero offset sensor signal to the predetermined reference voltage to thereby generate a binary output signal which is characteristic of the value of the zero offset sensor signal relative to the predetermined reference voltage.

4. The sensor of claim 3, wherein said single element galvanomagnetic element is a magnetoresistive element.

5. The sensor of claim 3, further comprising amplifier means for amplifying said sensor signal.

6. The sensor of claim 5, wherein said single element galvanomagnetic element is a magnetoresistive element.

7. A single galvanomagnetic element sensor system comprising:
    a rotating article having predetermined magnetic variations;
    a single galvanomagnetic element;
    magnetic biasing means for magnetically sensitizing said single galvanomagnetic element to the predetermined magnetic variations of the article;
    connection means for connecting said single galvanomagnetic element to a source of electrical power to thereby provide a sensor signal from said single galvanomagnetic element which is responsive to the magnetic variations of the article;
    valley detection means connected to said single galvanomagnetic element for detecting a lowest voltage of the sensor signal;
    reference signal means for providing a predetermined reference voltage; and
    comparator means for subtracting the lowest voltage from the sensor signal to provide a zero offset sensor signal and for comparing the zero offset sensor signal to the predetermined reference voltage to thereby generate a binary output signal which is characteristic of the value of the zero offset sensor signal relative to the predetermined reference voltage.

8. The sensor of claim 7, wherein said single element galvanomagnetic element is a magnetoresistive element.

9. The sensor of claim 7, further comprising amplifier means for amplifying said sensor signal.

10. The sensor of claim 9, wherein said single element galvanomagnetic element is a magnetoresistive element.

* * * * *